Jan. 11, 1938.     E. WIEGAND ET AL     2,104,784
ELECTRON DISCHARGE DEVICE
Filed Nov. 14, 1935
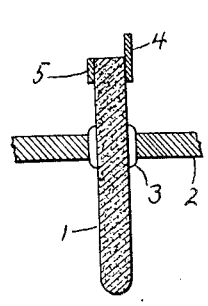
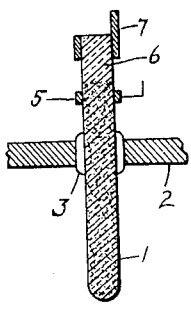
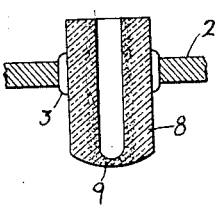
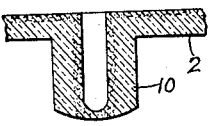
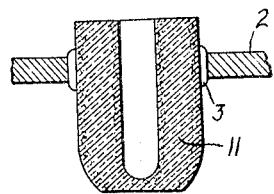
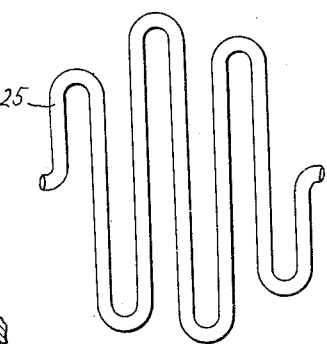
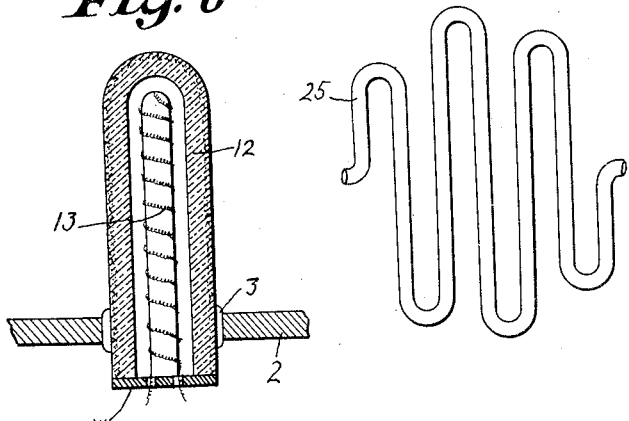
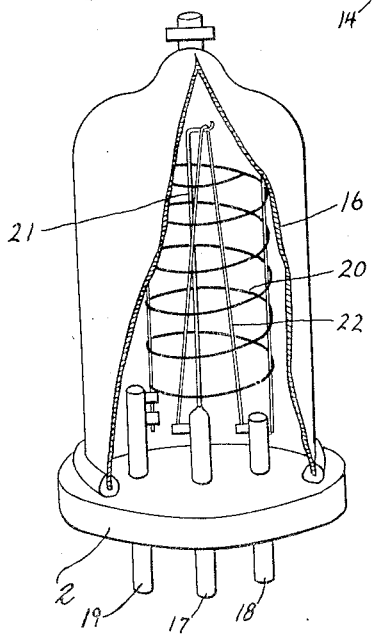
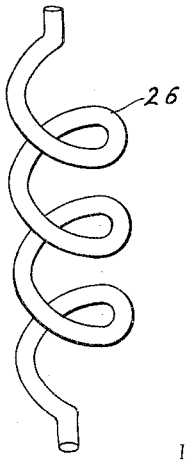
INVENTORS.
ERICH WIEGAND
WILFRIED MEYER
HANS PULFRICH
BY Charles McClair
ATTORNEY.

Patented Jan. 11, 1938

2,104,784

UNITED STATES PATENT OFFICE 2,104,784

ELECTRON DISCHARGE DEVICE

Erich Wiegand, Berlin-Waidmannslust, Wilfried Meyer, Birkenwerder, near Berlin, and Hans Pulfrich, Berlin-Wilmersdorf, Germany, assignors to Allgemeine Elektricitats Gesellschaft, Berlin, Germany, a corporation of Germany Application November 14, 1935, Serial No. 49,650
In Germany November 24, 1934

6 Claims. (Cl. 250—27.5)

It has been proposed in the manufacture of electric discharge devices to substitute ceramic materials for the glass or glass materials heretofore used for making the walls of the devices, on the ground this insures greater strength and temperature stability. The use of ceramics moreover makes it feasible to give the tubes forms which are not possible with glass. However, metallic parts when used for lead-ins or seals in the walls and when united with ceramic materials, do not provide satisfactory gas-tight joints. It is proposed to use conducting bodies or materials other than metallic conductors, and which will be capable of being united with ceramic materials in a gas-tight manner.

According to the invention, ceramic bodies containing low metallic oxides such as cadmium oxide, uranium oxide, titanium oxide, and which are partly conducting for electricity, are used in lieu of metal. The conductivity of such ceramic bodies need be only as high as may be necessary for the operation of the tube. Incorporated in the conducting oxides may be ceramic insulators such as quartz, or aluminum oxide or silicate.

The low metallic oxides, especially titanium oxide having an oxygen content ranging between $TiO_2$ and $TiO$ have proved successful, while the insulator may consist preferably of magnesia. Especially suitable is a mixture with a molecular ratio between magnesium and titanium of 2:1. The resistivity of a conductor consisting of magnesia and titanium oxide with a molecular ratio of 2 to 1 between the magnesium and titanium of 1 square centimeter in cross-sectional area and 1 centimeter in length, depending on the firing temperature, will be 1 ohm or less. These bodies are of blue color and are extremely firm and solid and resistant to temperature fluctuations.

In making conducting ceramic bodies, the molded mixture is fired either in an oxidizing and then in a reducing atmosphere, or else only in a reducing atmosphere. The bodies become conductive by virtue of the elimination of oxygen by reducing burning. By suitable shaping of the ceramic bodies and by employing oxidizing and the reducing gases during baking process in a suitable way, it is possible to obtain bodies which will be partly conducting and partly insulating or conducting only along the surface of the bodies. The baking temperature required to insure suitable density of the conductor for gas imperviousness is above 1000 degrees C. For a mixture of titanium oxide and magnesia as indicated, a temperature ranging between around 1400 and 1500 degrees C. will be required.

Inasmuch as the reducing burning or firing does not appreciably affect or change their mechanical properties, the ensuing bodies are readily united with other ceramic bodies, especially of the kind which have been made by oxidizing burning of a similar batch or mixture. A body partly conducting may be united with non-conducting ceramic bodies. A ceramic body made from a mixture comprising titanium oxide and magnesium oxide as stated may also be fused with soft glass.

Whenever it proves necessary to further diminish the electric resistance of conducting ceramic parts, then a metallic coating may be applied upon the surface thereof. Such a coating may be produced, for example, by electrolytic methods. However, the preferable procedure is to apply a metallic paste prior to baking, and to thereupon cause the metallic paste to sinter on. Coatings of this sort may be provided also upon the ceramic parts for fastening the electrodes.

The annexed drawing by way of example shows a number of exemplified embodiments of ceramic construction of the kind here disclosed. In the drawing:

Figures 1 and 2 show conductive pins sealed in the wall of an envelope,

Figures 3, 4, and 5 show lead-in conductors rendered conductive only on their surfaces, Figure 6 shows a cathode body embodying this invention, Figures 7 and 8 show electrode structures embodying this invention, and Figure 9 shows an electron discharge device constructed in accordance with this invention.

Figure 1 shows at 1 a ceramic pin or rodlet which is brought through a plate 2 comprising, for example, the wall of an electron discharge tube envelope such a shown in Figure 9. The said pin consists of ceramic material possessing electric conductivity, of, for example, partially reduced titanium oxide and magnesium oxide. The plate 2 is non-conducting and is preferably made of the same mixture, that is to say, of titanium oxide and magnesia, by burning or baking in an oxidizing atmosphere. The pin and plate are united by means of a glass flux or by a ceramic material 3 which will readily sinter. Pin 1 serving as a current supply lead may be shaped at one end to function as a base contact member and at the opposite end as a support for the internal structure or electrode assembly of the tube. Electrode support 4 may be attached to a metallic ring 5 at the inner end of the pin.

Figure 2 shows a modified embodiment of the current supply lead of Figure 1. Here, only the bottom end of the pin is treated in a reducing atmosphere so that only the plug part, the portion fused in the plate and a short portion above the plate 2, are conducting. The non-reduced end 6 located inside the discharge vessel may then be used for insulatingly carrying an electrode support 7. The voltage brought into the discharge vessel by way of the pin is applied to ring 5 located as shown. A pin of this kind may advantageously be made by subjecting the entire pin to a reducing treatment, whereupon the top end 6 may be oxidized again in an open flame, the remainder of the pin being protected against the oxidizing flame.

By suitable treatment with reducing gas it is possible to cause only superficial reduction of the ceramic body. Exemplified embodiments of bodies thus treated are shown in Figures 3, 4, and 5.

Figure 3 shows a ceramic plate 2 which supports a cup-shaped member 8. This cup is substantially thinner in its bottom 9 than in the side walls thereof. If in such a cup, the inside is reduced, then, if the depth of the reduced layer be suitably chosen, conduction of current from the inside to the outside will be feasible since the bottom 9 of the wall is reduced throughout its thickness. Figure 4 shows a similar embodiment of current-supply lead in which the cup 10 is integral with the ceramic plate.

Figure 5 shows a cup 11 which has been reduced on its inside and outside surfaces and whose lower surface has been ground away as far as the inner conducting layer. It is possible to apply to the two surfaces of this cup, which are separated by the intermediate insulating layer, potentials of different value and to thus combine in a tube two concentric current-supply leads. The cup shown in Figure 5 is brought through a ceramic insulation plate 2.

Electrodes may be fashioned from conducting ceramic substances as here disclosed.

Figure 6 illustrates a cathode body which may form part of the envelope wall. Fitted in a vacuum-tight manner in the ceramic plate 2 by the aid of a readily sintering ceramic substance 3 is the cathode tube 12. The tube is superficially reduced on the outside, and the resulting conducting surface is covered with an electron-emissive substance. A cathode connection may be made exteriorly of the envelope to the outwardly projecting part of the tube. Heater element 13 is fitted into the tube and supported by a bottom closure plate 14. The plate may be removed so the heater may be readily replaced.

Figure 7 shows a grid for arc rectifiers comprising a curved tube structure 25 of hollow conducting ceramic material adapted to be chilled on the inside by a current of water. Grids used in hot-cathode discharge vessels may be of spiral form to surround the cathode, as shown at 26 in Figure 8. A ceramic wall being superficially reduced on the outside only or rendered completely conducting may serve also as a screen.

Figure 9 shows an amplifier tube which incorporates the basic idea underlying the present invention. This tube comprises a bottom plate 2 and a bell-shaped envelope 16 manufactured from the new materials and mixtures here disclosed. This shell is either superficially reduced on the inside only or, after reduction, is treated on the outside by oxidation so that it will have an insulated outer surface and a conducting interior surface. The entire body may be made of conducting material. If the shell is conducting only on the inside, the envelope is preferably provided at suitable points with a cup for a lead-in conductor as shown in Figures 3 and 4. The anode or plate may be furnished with cooling channels or ducts. Sealed in the bottom of the vessel are three current-supply leads or pins 17, 18, and 19, adapted to support the grid 20 and the filamentary cathode 22. In this arrangement, one of the current-supply leads to the cathode is substantially longer and is submitted to an oxidizing treatment at the top end so that this part may be used as a support 21 for the middle of the V-shaped filament 22. The conducting portion of the envelope may if desired be employed as the anode of the device.

The conducting ceramic material here disclosed will be found useful also for a great number of other discharge vessels, for instance, in X-ray and in cathode-ray tubes, or in photo-cells.

We claim:

1. In combination, an envelope insulating wall consisting of a higher metal oxide selected from the group consisting of titanium oxide, uranium oxide, or cadmium oxide and a ceramic insulating substance of the group consisting of quartz, magnesia, aluminum oxide or aluminum silicate, and a current conducting portion in said wall consisting of a lower oxide of the metal oxide selected from the first-mentioned group and one of said ceramic insulating substances.

2. The envelope of an electron discharge device comprising a wall of insulating ceramic material, a current conducting portion in said wall consisting of a low metallic oxide and a ceramic insulating substance selected from the group consisting of quartz, magnesia, aluminum oxide or aluminum silicate.

3. An envelope comprising an insulating wall of ceramic material, a lead-in conductor sealed in said wall consisting of a mixture of said ceramic material and a conducting compound of titanium.

4. An electron discharge device comprising an insulating ceramic envelope wall of magnesia and titanium oxide, and a semi-conducting ceramic lead-in conductor sealed gas tight in said wall consisting of magnesia and titanium oxide having an oxygen content between $TiO_2$ and $TiO$.

5. An electron discharge device comprising an insulating ceramic envelope wall of magnesia and a higher oxide of titanium oxide, and a semi-conducting ceramic lead-in conductor sealed gas-tight in said wall consisting of magnesia and a lower oxide of titanium oxide, said lead-in conductor extending inwardly to function as an electrode support and extending outwardly to function as a contact pin.

6. An article of the class described comprising a ceramic body, said body consisting of a higher metal oxide selected from the group consisting of titanium oxide, uranium oxide or cadmium oxide and a ceramic insulating substance of the group consisting of quartz, alumina, aluminum oxide or aluminum silicate, the surface of said body consisting of a lower oxide of the metal oxide selected from the first-mentioned group and one of said ceramic insulating substances.

ERICH WIEGAND.
WILFRIED MEYER.
HANS PULFRICH.